(12) United States Patent
Hamada

(10) Patent No.: US 12,502,970 B2
(45) Date of Patent: Dec. 23, 2025

(54) ELECTRIFIED VEHICLE

(71) Applicant: TOYOTA JIDOSHA KABUSHIKI KAISHA, Toyota (JP)

(72) Inventor: Eita Hamada, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 18/641,639

(22) Filed: Apr. 22, 2024

(65) Prior Publication Data

US 2025/0083527 A1    Mar. 13, 2025

(30) Foreign Application Priority Data

Sep. 13, 2023   (JP) ................................. 2023-148704

(51) Int. Cl.
*B60L 3/00*      (2019.01)
*B60L 15/20*     (2006.01)

(52) U.S. Cl.
CPC ......... *B60L 3/0061* (2013.01); *B60L 15/2036* (2013.01); *B60L 2210/40* (2013.01); *B60L 2220/46* (2013.01); *B60L 2240/423* (2013.01); *B60L 2240/429* (2013.01); *B60L 2270/142* (2013.01)

(58) Field of Classification Search
CPC .............. B60L 3/0061; B60L 15/2036; B60L 2210/40; B60L 2220/46; B60L 2240/423; B60L 2240/429; B60L 2270/142
See application file for complete search history.

(56) References Cited

U.S. PATENT DOCUMENTS

| | | | | |
|---|---|---|---|---|
| 5,596,153 A | * | 1/1997 | Bulgrien | ............... F16F 15/123 |
| | | | | 73/862.326 |
| 5,773,938 A | * | 6/1998 | Seong | ................... H02P 23/186 |
| | | | | 360/71 |
| 7,362,154 B2 | * | 4/2008 | Mo | ...................... H03K 3/0375 |
| | | | | 327/202 |
| 7,898,198 B2 | * | 3/2011 | Murphree | ............... H02P 23/03 |
| | | | | 318/434 |

(Continued)

FOREIGN PATENT DOCUMENTS

| | | |
|---|---|---|
| JP | 2008-037133 A | 2/2008 |
| JP | 2016-111742 A | 6/2016 |

*Primary Examiner* — Gertrude Arthur Jeanglaude
(74) *Attorney, Agent, or Firm* — SoraIP, Inc.

(57) ABSTRACT

An electrified vehicle includes first and second motors, first and second inverters for driving the first and second motors, respectively, and a control device configured to control the first and second inverters by setting first and second current effective value commands, and first and second current advance value commands of first and second current vectors in a dq coordinate system including a d-axis and a q-axis as coordinate axes based on first and second torque commands for the first and second motors. The control device is configured to set the first and second current effective value commands and the first and second current advance value commands to control a torque variation difference to be a predetermined torque variation difference or larger when a torque difference is a predetermined torque difference or smaller and a rotational speed difference is a predetermined rotational speed difference or smaller.

3 Claims, 4 Drawing Sheets

(56) References Cited

U.S. PATENT DOCUMENTS

| | | | | |
|---|---|---|---|---|
| 8,059,998 B2* | 11/2011 | Koike | ................... | G03G 15/167 |
| | | | | 399/302 |
| 8,494,729 B2* | 7/2013 | Li | ............................ | B60K 6/38 |
| | | | | 180/197 |
| 9,595,897 B2* | 3/2017 | Uematsu | .................... | H02P 6/15 |
| 12,269,352 B2* | 4/2025 | Jang | ........................ | B60L 55/00 |
| 2016/0153419 A1* | 6/2016 | Minegishi | ............ | F02N 11/0866 |
| | | | | 903/910 |
| 2016/0200324 A1* | 7/2016 | Suzuki | .................... | B60L 15/20 |
| | | | | 701/22 |

* cited by examiner

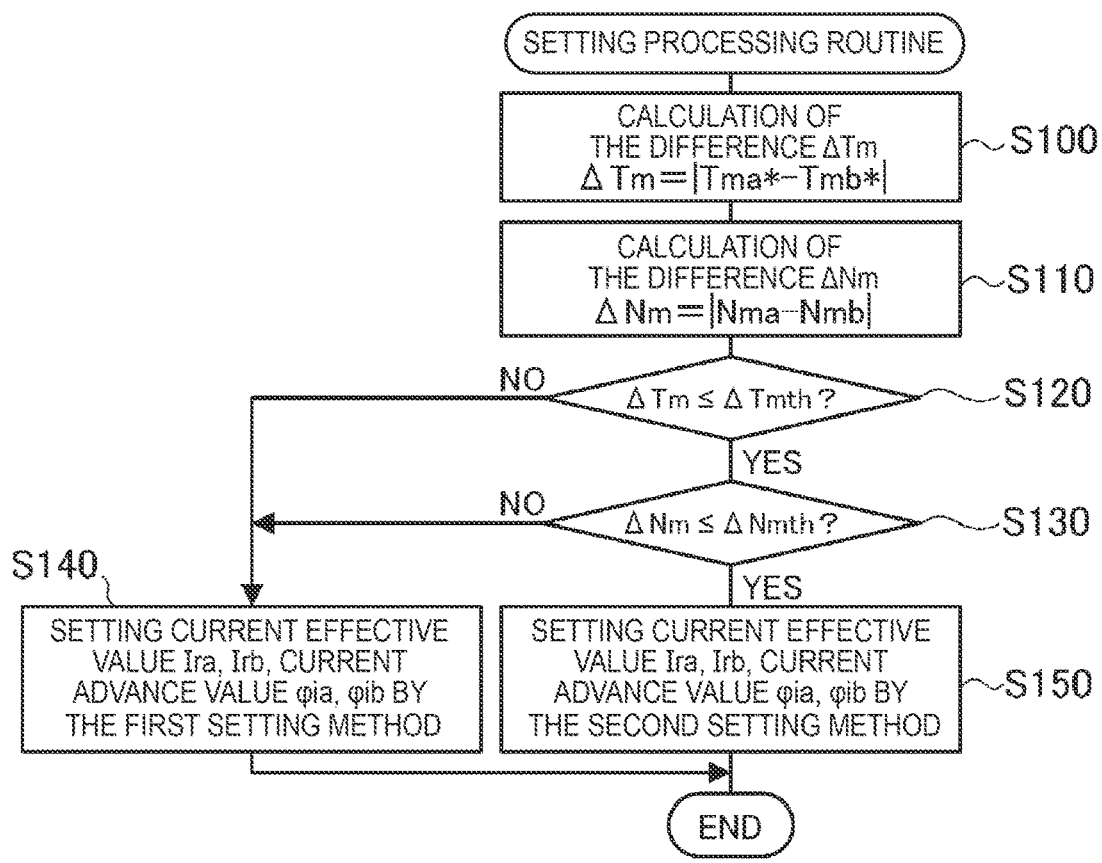
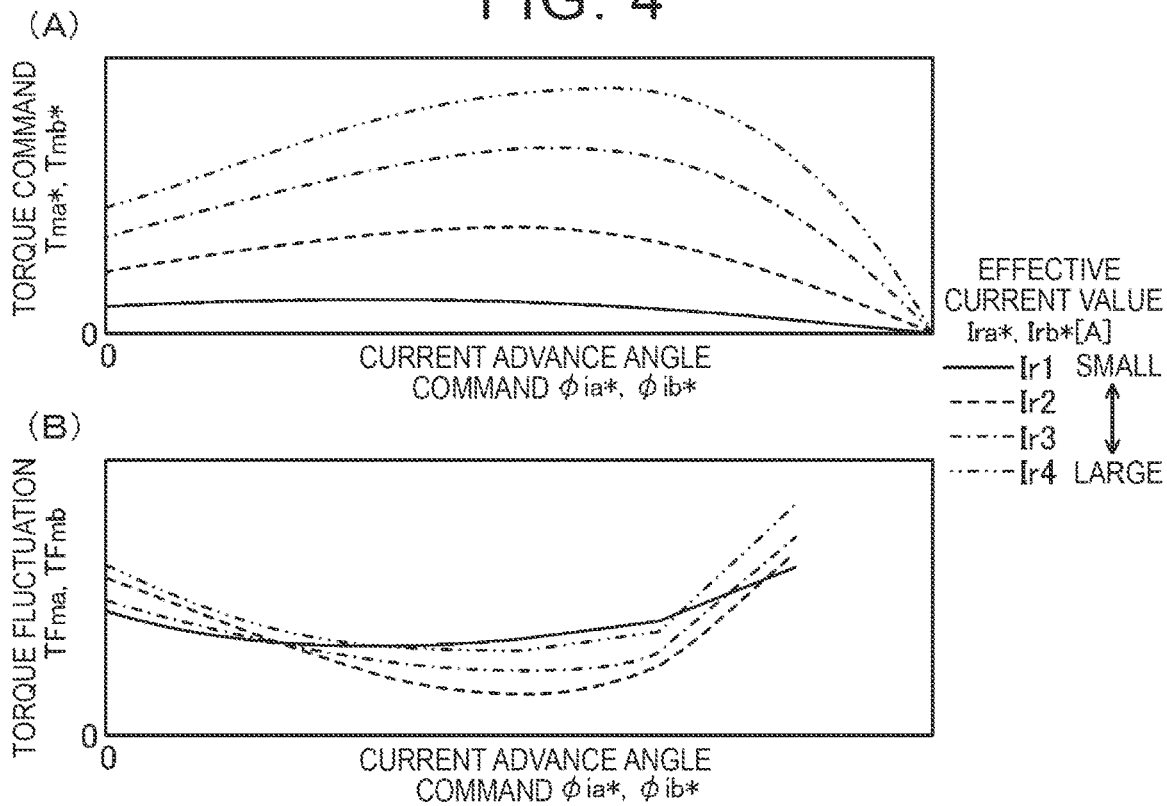

ELECTRIFIED VEHICLE

CROSS-REFERENCE TO RELATED APPLICATION

This application claims priority to Japanese Patent Application No. 2023-148704 filed on Sep. 13, 2023, incorporated herein by reference in its entirety.

BACKGROUND

1. Technical Field

The present disclosure relates to an electrified vehicle.

2. Description of Related Art

Hitherto, as an electrified vehicle of this type, there has been proposed an electrified vehicle including an in-wheel motor including a motor and a speed reduction mechanism for each wheel (see, for example, Japanese Unexamined Patent Application Publication No. 2008-37133 (JP 2008-37133 A)). In this electrified vehicle, the combination of the numbers of teeth of the speed reduction mechanisms is varied between the in-wheel motors of at least one combination. Therefore, the frequencies of sounds generated from the in-wheel motors of the combination are positively varied to suppress a beat caused by interference of the sounds.

SUMMARY

When the components (hardware configurations) of the in-wheel motors are varied as in the above electrified vehicle, the manufacturing costs increase. Therefore, it is an issue to suppress the occurrence of a beat while suppressing an increase in manufacturing costs.

A main object of an electrified vehicle of the present disclosure is to suppress the occurrence of a beat while suppressing an increase in manufacturing costs.

In order to achieve the above main object, the electrified vehicle of the present disclosure adopts the following measures.

In summary, the electrified vehicle of the present disclosure includes:

a first motor and a second motor;

a first inverter and a second inverter configured to drive the first motor and the second motor, respectively; and a control device configured to control the first inverter and the second inverter by setting a first current effective value command, a second current effective value command, a first current advance value command, and a second current advance value command of a first current vector and a second current vector in a dq coordinate system including a d-axis and a q-axis as coordinate axes based on a first torque command and a second torque command for the first motor and the second motor.

The control device is configured to set the first current effective value command, the second current effective value command, the first current advance value command, and the second current advance value command to control a torque variation difference between a first torque variation and a second torque variation of the first motor and the second motor to be equal to or larger than a predetermined torque variation difference when a torque difference between the first torque command and the second torque command is equal to or smaller than a predetermined torque difference and a rotational speed difference between a first rotational speed and a second rotational speed of the first motor and the second motor is equal to or smaller than a predetermined rotational speed difference.

In the electrified vehicle of the present disclosure, when the torque difference is equal to or smaller than the predetermined torque difference and the rotational speed difference is equal to or smaller than the predetermined rotational speed difference, the first and second current effective value commands and the first and second current advance value commands are set to control the torque variation difference to be equal to or larger than the predetermined torque variation difference. The torque difference is a difference between the first and second torque commands. The rotational speed difference is a difference between the first and second rotational speeds of the first and second motors. The torque variation difference is a difference between the first and second torque variations of the first and second motors. The inventors have found the following by experiments and analyses when the torque difference is equal to or smaller than the predetermined torque difference and the rotational speed difference is equal to or smaller than the predetermined rotational speed difference. As the first and second torque variations increase, the sounds and vibrations of the first and second motors are likely to increase. When the sounds and vibrations of the first and second motors are at the same levels, a beat is likely to occur. Therefore, when the torque difference is equal to or smaller than the predetermined torque difference and the rotational speed difference is equal to or smaller than the predetermined rotational speed difference, the inverters are controlled so that the torque variation difference is equal to or larger than the predetermined torque variation difference. The inverters set the first and second current effective value commands and the first and second current advance value commands. Therefore, the sound and vibration of one of the first and second motors can be made greater and conspicuous and the sound and vibration of the other can be made smaller and inconspicuous. As a result, the occurrence of the beat can be suppressed. That is, it is possible to suppress the occurrence of the beat while suppressing the increase in manufacturing costs as compared with a case where the hardware configuration of the electrified vehicle is changed.

In the electrified vehicle of the present disclosure, the control device may be configured to set the first current effective value command, the second current effective value command, the first current advance value command, and the second current advance value command to minimize one of the first torque variation and the second torque variation. Thus, the sound and vibration of the other of the first and second motors can be made even smaller and even more inconspicuous.

In the electrified vehicle of the present disclosure, the first motor and the second motor may be mounted to drive a right drive wheel and a left drive wheel, respectively. In this case, the significance is high because the condition that the torque difference is equal to or smaller than the predetermined torque difference and the rotational speed difference is equal to or smaller than the predetermined rotational speed difference is easily satisfied during straight travel etc.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating an example of a setting processing routine executed by the electronic control unit 70;

FIG. 4 is an explanatory diagram illustrating an exemplary relation between the torque commands Tma*, Tmb* of the motors 32 and 42, the torque variations TFma, TFmb, the current advance angle value commands φia*, φib* and the current effective value commands Ira*, Irb*.

DETAILED DESCRIPTION OF EMBODIMENTS

Figure 1:
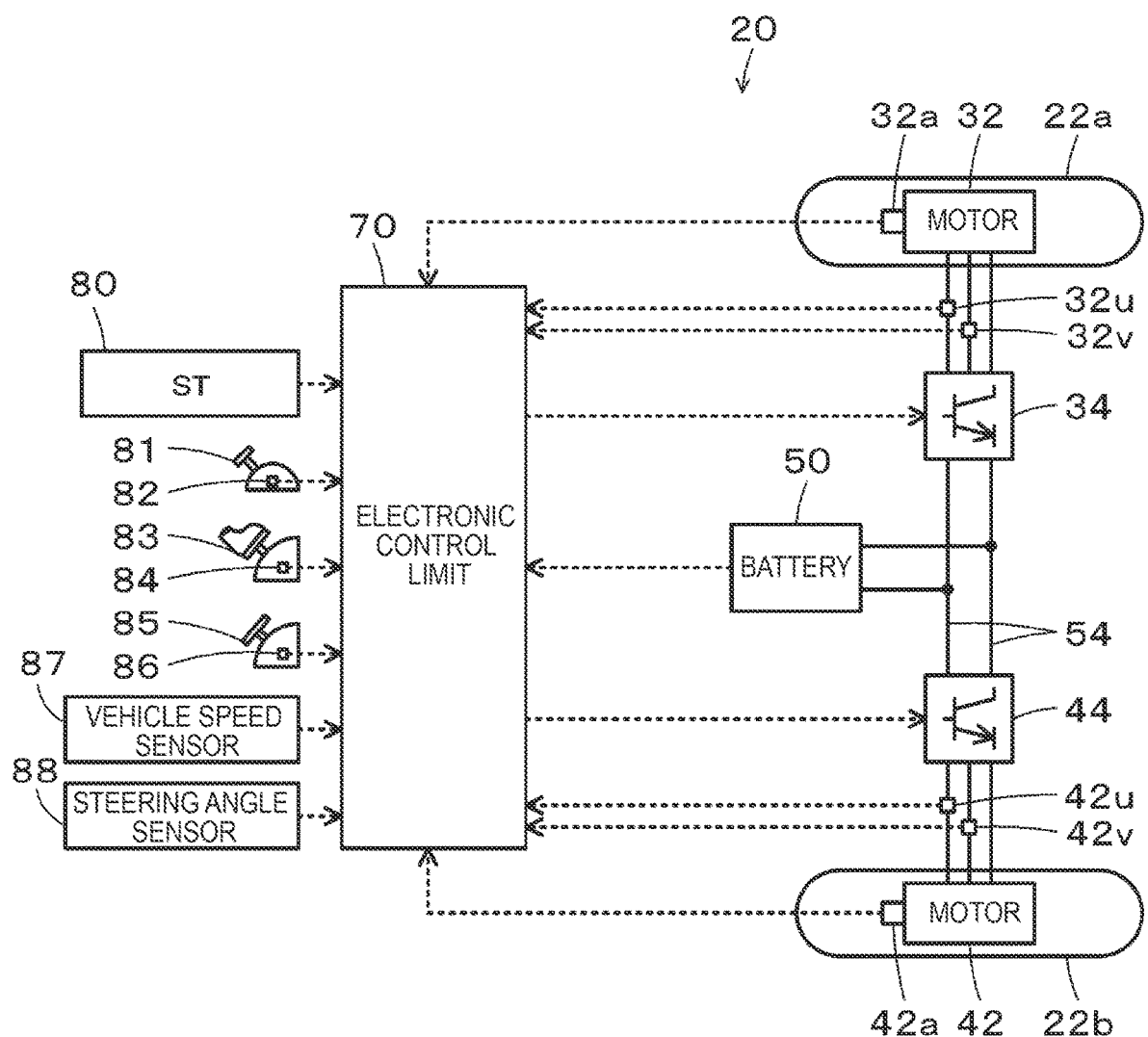
FIG. 1 is a schematic configuration diagram of a battery electric vehicle 20 according to an embodiment of the present disclosure.
Figure 2:
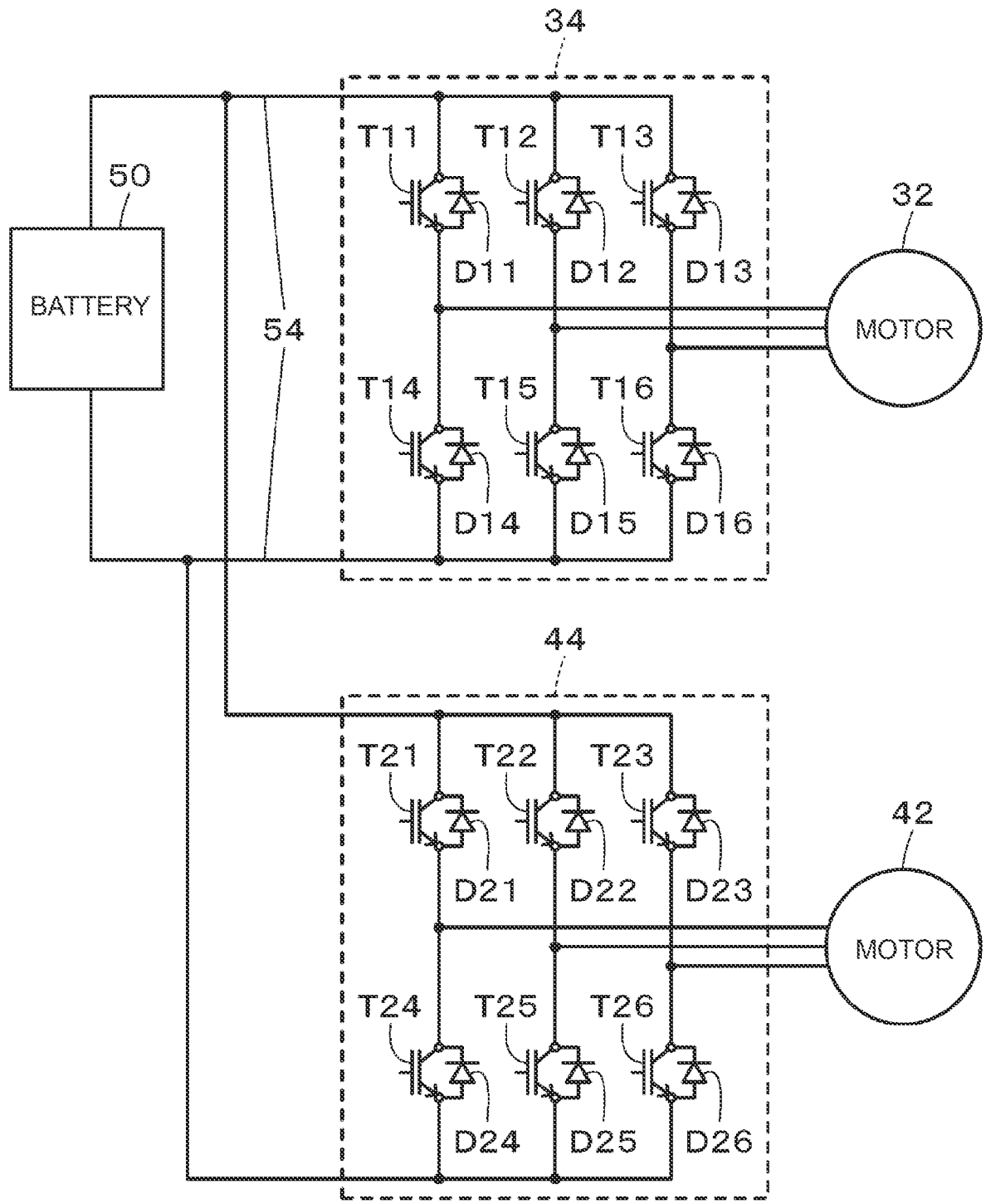
FIG. 2 is a schematic configuration diagram of an electric drive system included in battery electric vehicle 20.

Embodiments of the present disclosure will be described with reference to the drawings. FIG. 1 is a schematic configuration diagram of a battery electric vehicle 20 according to an embodiment of the present disclosure. FIG. 2 is a schematic configuration diagram of an electric drive system included in battery electric vehicle 20. As shown in FIG. 1, battery electric vehicle 20 of the embodiment includes two motors 32 and 42, two inverters 34 and 44, a battery 50 as a power storage device, and an electronic control unit 70 as a control device.

The motors 32 and 42 are configured as synchronous generator motors (in-wheel motors) mounted in the right and left drive wheels 22b, 22a, and drive the right and left drive wheel 22b, 22a. The motors 32 and 42 have the same specifications.

The inverters 34 and 44 are used to drive the motors 32 and 42 and are connected to the power line 54. As shown in FIG. 2, the inverter 34 includes transistors T11 to T16 as six switching elements, and six diodes D11 to D16 connected in parallel to the six transistors T11 to T16. Transistors T11 to T16, respectively, are arranged in pairs of two so as to be the source side and sink side with respect to the positive side line and the negative side line of the power line 54. Each of the connecting points of the two transistors that are the pair of the transistors T11 to T16 is connected to each of the three-phase (U-phase, V-phase, and W-phase) coils of the motor 32. Thus, when the inverter 34 is energized, the electronic control unit 70 adjusts the rate of on-time for each of the two transistors paired from the transistors T11 to T16. As a result, a rotating magnetic field is formed in the three-phase coil, and the motor 32 is rotationally driven. The inverter 44, like the inverter 34, has six transistors T21 to T26 and six diodes D21 to D26. When a voltage is applied to the inverter 44, the electronic control unit 70 adjusts the ratio of the on-time for each of the two transistors that are paired from the transistors T21 to T26. As a result, a rotating magnetic field is formed in the three-phase coil, and the motor 42 is rotationally driven.

As shown in FIG. 1, the battery 50 is connected to the power line 54 together with the inverters 34 and 44. The battery 50 is configured as, for example, a lithium-ion secondary battery or a nickel-hydrogen secondary battery.

The electronic control unit 70 includes a microcomputer having a CPU, ROM, RAM, a flash memory, an input/output port, and a communication port, various driving circuitry, and various logic IC. The electronic control unit 70 receives signals from various sensors via input ports. For example, the electronic control unit 70 receives the rotational positions θma and θmb from the rotational position sensors 32a, 42a and the phase currents Iua, Iva, Iub, Ivb from the current sensors 32u, 32v, 42u, 42v. The rotational position sensors 32a, 42a detects the rotational position of the rotor of the motors 32 and 42. The current sensor 32u, 32v, 42u, 42v detects the U-phase and V-phase current of the motors 32 and 42. The electronic control unit 70 also receives a voltage Vb from a voltage sensor mounted between terminals of the battery 50 and a current Ib from a current sensor mounted at an output terminal of the battery 50. The electronic control unit 70 also receives a start signal from the start switch 80 and a shift position SP from the shift position sensor 82 that detects the operating position of the shift lever 81. The electronic control unit 70 also receives an accelerator operation amount Acc from the accelerator pedal position sensor 84, a brake pedal position BP from the brake pedal position sensor 86, a vehicle speed V from the vehicle speed sensor 87, and a steering angle θst from the steering angle sensor 88. The accelerator pedal position sensor 84 detects the amount of depression of the accelerator pedal 83. The brake pedal position sensor 86 detects a depression amount of the brake pedal 85.

The electronic control unit 70 outputs various control signals via an output port. For example, the electronic control unit 70 outputs a switching control signal from the transistors T11 to T16, T21 to T26 of the inverters 34 and 44. The electronic control unit 70 calculates the electric angles θea and θeb, the angular velocities ωma and ωmb, and the rotational speeds Nma, Nmb of the motors 32 and 42 based on the rotational positions θma and θmb of the rotors of the motors 32 and 42 from the rotational position sensors 32a, 42a.

In battery electric vehicle 20 of the embodiment configured in this way, the electronic control unit 70 first sets the required torque Td* required for traveling based on the accelerator operation amount Acc and the vehicle speed V. Subsequently, the torque distribution ratios Da, Db (Da+Db=1) of the motors 32 and 42 is set based on the steering angle θst or the like. Then, the required torque Td* is multiplied by the torque distribution ratios Da, Db to set the torque commands Tma*, Tmb* of the motors 32 and 42. When the torque commands Tma*, Tmb* are set in this manner, switching control of transistors T11 to T16, T21 to T26 of the inverters 34 and 44 is performed so that the motors 32 and 42 are driven by the torque command Tma*, Tmb*.

Here, the control of the inverters 34 and 44 by the electronic control unit 70 will be described. The inverters 34 and 44 are basically controlled by pulse-width-modulation control (PWM control). In the control of the inverters 34 and 44, first, assuming that the sum of the phase currents of the respective phases of the motors 32 and 42 is 0, the phase currents Iua, Iub of the U-phase and the phase currents Iva, Ivb of the V-phase are coordinate-transformed (three-phase-two-phase transformation) into the currents Iqa, Iqb of the d-axis and the currents Ida, Idb of the q-axis in dq coordinate system using the electric angles θea and θeb of the motors 32 and 42. Dq coordinate system includes a d-axis and a q-axis as coordinate axes. Subsequently, the current effective value commands Ira*, Irb* and the current advance value commands φia* and φib* of the current vector in dq coordinate system are set based on the torque commands Tma*, Tmb* of the motors 32 and 42 by a setting process routine described later. The current effective value commands Ira*, Irb* are command values of the effective values of the current supplied by the motors 32 and 42, and the current advance value commands φia*, φib* are command values of the angle (advance value) of the current supplied to the motor 32 with respect to the q-axis.

In this way, the current effective value commands Ira*, Irb* and the current advance angle value commands φia*, φib* are set. Then, the current commands Ida*, Idb* of the d-axis and the current commands Iqa*, Iqb* of the q-axis are set based on the current effective value commands Ira*, Irb* and the current advance angle value commands φia*, φib*. The current effective value commands Ira*, Irb* are obtained as the square root of the sum of the square of the d-axis current commands Ida*, Idb* and the square of the q-axis current commands Iqa*, Iqb*. The current advance angle value commands φia* and φib* are obtained as an angle (advance angle value) of a current vector (a vector containing the current commands Ida*, Idb of the d-axis and the current commands Iqa*, Iqb of the q-axis) in dq coordinate system with respect to the q-axis. In consideration of these, this processing is performed.

In this way, the d-axis current commands Ida*, Idb* and the q-axis current commands Iqa*, Iqb* are set. Then, the voltage commands Vda*, Vdb* of the d-axis and the voltage commands Vqa*, Vqb* of the q-axis are set. These are set so that the differences between the current commands Ida*, Idb* of the d-axis and the current commands Iqa*, Iqb* of the q-axis and the currents Ida, Idb of the d-axis and the currents Iqa, Iqb of the q-axis are canceled. Subsequently, coordinate conversion (two-phase-three-phase conversion) is performed using the electric angles θea and θeb of the motors 32 and 42. As a result, the voltage commands Vda*, Vdb* of the d-axis and the voltage commands Vqa*, Vqb* of the q-axis are converted into the voltage commands Vua*, Vub* of the U-phase, the voltage commands Vva*, Vvb* of the V-phase, and the voltage commands Vwa*, Vwb* of the W-phase. Then, PWM signals are generated from the transistors T11 to T16, T21 to T26. This is performed by comparing the voltage commands Vua*, Vub* of the U-phase, the voltage commands Vva*, Vvb* of the V-phase, the voltage commands Vwa*, Vwb* of the W-phase, and the carrier voltage. Then, switching control of the transistors T11 to T16, T21 to T26 is performed using PWM signals of the transistors T11 to T16, T21 to T26.

Next, the operation of battery electric vehicle 20 of the embodiment, in particular, the process of setting the current effective value commands Ira*, Irb* and the current advance value commands φia*, φib* of the motors 32 and 42 will be described. FIG. 3 is a flowchart illustrating an example of a setting processing routine executed by the electronic control unit 70. This routine is repeatedly executed.

When this routine is executed, the electronic control unit 70 first calculates the difference (absolute value of the value obtained by subtracting the other from one) ΔTm of the torque commands Tma*, Tmb* of the motors 32 and 42 (S100). In addition to this calculation, the electronic control unit 70 calculates a difference (an absolute value obtained by subtracting the other from one) ΔNm between the rotational speeds Nma, Nmb of the motors 32 and 42 (S110).

Subsequently, it is determined whether or not the difference ΔTm is equal to or less than the threshold ΔTmth (S120), and it is determined whether or not the difference ΔNm is equal to or less than the threshold ΔNmth (S130). Here, the threshold value ΔTmth is a threshold value used for determining whether or not the torque command Tma* of the motor 32 and the torque command Tmb* of the motor 42 are close to each other, and is determined in advance by experimentation, analysis, or the like, and is used, for example, about several tens of rpm. The threshold value ΔNmth is a threshold value used for determining whether or not the rotational speed Nma of the motor 32 and the rotational speed Nmb of the motor 42 are close to each other, and is determined in advance by experimentation, analysis, or the like, and, for example, about several tens of Nm is used. The inventors have confirmed that, when the torque command Tma* of the motor 32 and the torque command Tmb* of the motor 42 are close to each other and the rotational speed Nma of the motor 32 and the rotational speed Nmb of the motor 42 are close to each other, there is a case where a beat sound is generated based on the noise and the oscillation generated in the motors 32 and 42, and thus the occupant can feel uncomfortable. The threshold value ΔNmth and the threshold value ΔTmth are determined in advance by an experiment, an analysis, or the like as an upper limit of a range of the difference ΔNm and an upper limit of a range of the difference ΔTm, which may generate a beat sound.

When it is determined in S120 that the difference ΔTm is larger than the threshold ΔTmth or when it is determined in S130 that the difference ΔNm is larger than the threshold ΔNmth, it is determined that a beat sound is not generated. In this case, the current effective value commands Ira*, Irb* and the current advance angle value commands φia* and φib* are set by the first setting method (S140), and the routine is ended.

When it is determined that the difference ΔTm is equal to or less than the threshold ΔTmth in S120 and the difference ΔNm is equal to or less than the threshold ΔNmth in S130, it is determined that a beat sound may be generated. In this case, the current effective value commands Ira*, Irb* and the current advance angle value commands φia* and φib* are set by the second setting method (S150), and the routine is ended.

Here, the first and second setting methods will be described. FIG. 4 is an explanatory diagram illustrating an exemplary relation between the torque command Tma*, Tmb* and the torque variations TFma, TFmb of the motors 32 and 42, the current advance angle value commands φia*, φib* and the current effective value commands Ira*, Irb*. Part (A) of FIG. 4 is an explanatory diagram illustrating an exemplary relation between the torque commands Tma*, Tmb* and the current advance angle value commands φia*, φib* and the current effective value commands Ira*, Irb* of the motors 32 and 42. Part (B) of FIG. 4 is an explanatory diagram illustrating an exemplary relation between the torque variations TFma, TFmb of the motors 32 and 42, the current advance angle value commands φia*, φib* and the current effective value commands Ira*, Irb*. As described above, the motors 32 and 42 have the same specifications. Therefore, in the embodiment, a common relationship is used for the motors 32 and 42.

In the first setting method, the current effective value commands Ira*, Irb* and the current advance value commands φia* and φib* are set so that the current effective value commands Ira*, Irb* are minimized while the torque commands Tma*, Tmb* are realized. At this time, the relation of the part (A) in FIG. 4 and the motors 32 and 42 use the torque commands Tma*, Tmb*.

In the second setting method, the current effective value commands Ira*, Irb* and the current advance value commands φia*, φib* are set according to the first pattern or the second pattern. In the first pattern, the current effective value command Ira* and the current advance value command φia* are set so that the torque variation TFma of the motor 32 is minimized while realizing the torque command Tma*. At this time, the part (A) in FIG. 4, the part (B) in FIG. 4, and the torque command Tma* of the motor 32 are used. Then, the current effective value command Irb* and the current advance value command φib* are set so that the difference ΔTFm between the torque variations TFma, TFmb of the motors 32 and 42 becomes equal to or larger than the threshold ΔTFmth while realizing the torque command Tmb*. At this time, the part (A) in FIG. 4, the part (B) in FIG. 4, and the torque command Tmb* of the motor 42 are used. The threshold value ΔTFmth is determined in advance by an experiment, an analysis, or the like so as to suppress generation of a beat sound. In the second pattern, the current effective value command Irb* and the current advance value command φib* are set so that the torque variation FTmb of the motor 42 is minimized while realizing the torque command Tmb*. At this time, the part (A) in FIG. 4, the part (B) in FIG. 4, and the torque command Tmb* of the motor 42 are used. Then, while realizing the torque command Tma*, the current effective value command Ira* and the current advance value command φia* are set so that the difference ΔTFm becomes equal to or larger than the threshold ΔTFmth. At this time, the part (A) in FIG. 4, the part (B) in FIG. 4, and the torque command Tma* of the motor 32 are used. One of the first pattern and the second pattern may be used at all times, or may be switched periodically (for example, at predetermined time intervals).

The inventors have confirmed the following by experiments, analysis, and the like. When the difference ΔTm is equal to or less than the threshold ΔTmth and the difference ΔNm is equal to or less than the threshold ΔNmth, the noise and vibration of the motors 32 and 42 tend to increase as the torque fluctuation of the motors 32 and 42 increases. In addition, when the sounds and vibrations of the motors 32 and 42 are of the same order, a beat sound is likely to be generated.

In the embodiment, when the difference ΔTm is equal to or less than the threshold ΔTmth and the difference ΔNm is equal to or less than the threshold ΔNmth, the current effective value commands Ira*, Irb* and the current advance angle value commands φia* and φib* are set so that the difference ΔTFm is equal to or greater than the threshold ΔTFmth. As a result, it is possible to make the sound and vibration of one of the motors 32 and 42 conspicuous while making the sound and vibration of the other conspicuous by making the sound and vibration of the other less conspicuous. As a result, it is possible to suppress generation of a beat sound. That is, it is possible to suppress generation of a beat sound while suppressing an increase in manufacturing cost as compared with a case where the hardware configuration of battery electric vehicle 20 is changed. By suppressing generation of a beat sound, it is possible to suppress the occurrence of discomfort to an occupant. Moreover, the current effective value commands Ira*, Irb* and the current advance angle value commands φia*, φib* are set so that the torque variation of the motor 32 is minimized in the first pattern. Further, in the second pattern, the current effective value commands Ira*, Irb* and the current advance angle value commands φia*, φib* are set so that the torque variation of the motor 42 is minimized. This makes it possible to make the other sounds and vibrations of the motors 32 and 42 less noticeable. It is preferable that, for example, the difference ΔTFm becomes the threshold ΔTFmth so that the difference ΔTFm becomes as small as possible within a range equal to or larger than the threshold ΔTFmth. This is to prevent the noise and vibration of one of the motors 32 and 42 from becoming excessively large.

In battery electric vehicle 20 of the present embodiment described above, the current effective value commands Ira*, Irb* and the current advance angle value commands φia*, φib* are set as follows. When the difference ΔTm between the torque commands Tma*, Tmb of the motors 32 and 42 is equal to or less than the threshold ΔTmth and the difference ΔNm between the rotational speeds Nma, Nmb of the motors 32 and 42 is equal to or less than the threshold ΔNmth, the difference ΔTFm becomes equal to or greater than the threshold ΔTFmth.

This makes it possible to make the other sound and vibration less noticeable while making the sound and vibration of one of the motors 32 and 42 more noticeable, and to suppress the occurrence of a beat sound. That is, it is possible to suppress generation of a beat sound while suppressing an increase in manufacturing cost as compared with a case where the hardware configuration of battery electric vehicle 20 is changed.

In the above-described embodiment, when the difference ΔTm is equal to or less than the threshold ΔTmth and the difference ΔNm is equal to or less than the threshold ΔNmth, the electronic control unit 70 sets the current effective value commands Ira*, Irb* and the current advance angle value commands φia*, φib* so that the torque variation TFma of the motor 32 is minimized in the first pattern. Further, in the second pattern, the current effective value commands Ira*, Irb* and the current advance angle value commands φia*, φib* are set so that the torque variation TFmb of the motor 42 is minimized. However, it is not limited thereto. For example, in the first pattern, the current effective value commands Ira*, Irb* and the current advance angle value commands φia*, φib* may be set so that the torque variation TFma of the motor 32 is within a predetermined range including the smallest. Further, in the second pattern, the current effective value commands Ira*, Irb* and the current advance angle value commands φia*, φib* may be set so that the torque variation TFmb of the motor 42 falls within the predetermined range.

In the above-described embodiment, the battery 50 is used as the power storage device, but the present disclosure is not limited thereto. For example, a capacitor or the like may be used as the power storage device in addition to or instead of the battery 50.

In the above-described embodiment, the motors 32 and 42 are mounted in the right and left drive wheels 22b, 22a, but the present disclosure is not limited thereto. For example, the motors 32, 42 may be mounted on left and right axles.

Figure 5:
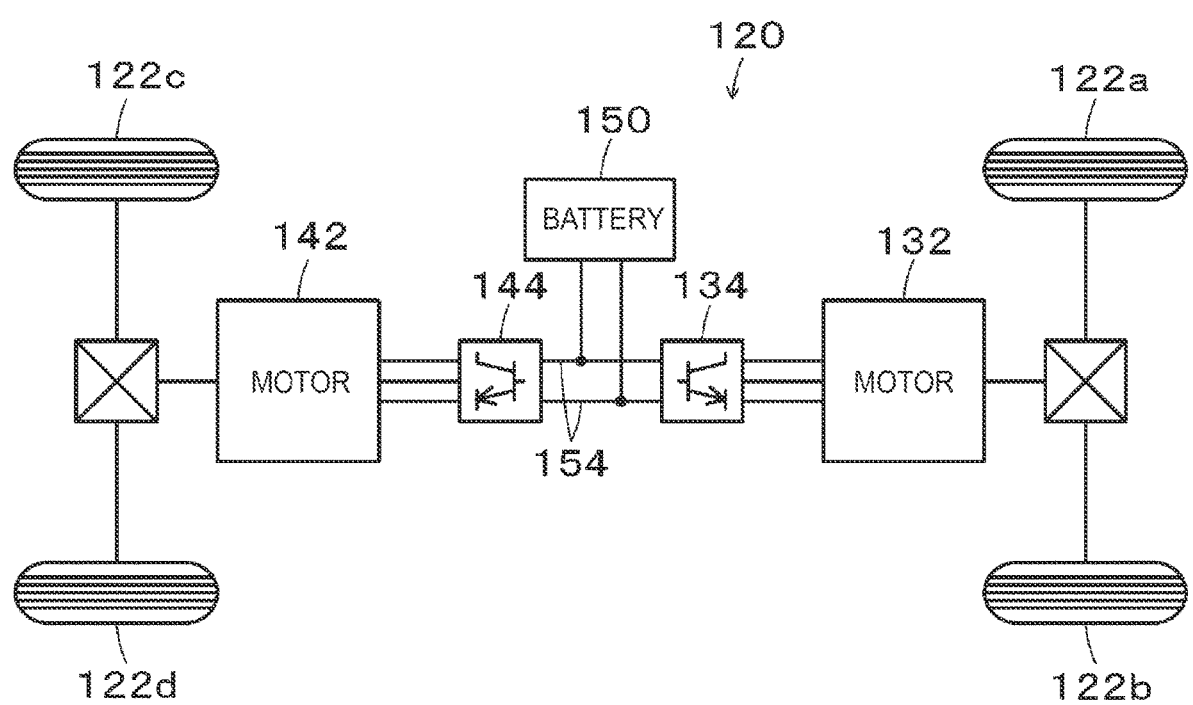
FIG. 5 is a schematic configuration diagram of a battery electric vehicle 120 according to a modification.

In the above-described embodiment, battery electric vehicle 20 includes the motors 32 and 42, the inverters 34 and 44, and the battery 50, as shown in FIG. 1. The motors 32 and 42 are mounted in the right and left drive wheels 22b, 22a. The inverters 34 and 44 drive the motors 32 and 42. The battery 50 is connected to the inverters 34 and 44 via a power line 54. However, it is not limited thereto. For example, as shown in battery electric vehicle 120 of the modification of FIG. 5, a motor 132, a motor 142, inverters 134, 144, and a battery 150 may be provided. The motor 132 may be connected to the front wheels 122a, 122b. The motor 142 may be connected to the rear wheels 122c, 122d. The inverters 134, 144 may drive the motors 132, 142. The battery 150 may be connected to the inverters 134, 144 via a power line 154.

In the above-described embodiment, battery electric vehicle 20 configuration including the two motors 32 and 42 is employed, but the present disclosure is not limited thereto. For example, hybrid electric vehicle may be configured to further include an engine in addition to the two motors. In addition, a configuration of a fuel cell electric vehicle including a fuel-cell in addition to two motors may be employed.

The correspondence between the main elements of the embodiments and the main elements of the disclosure described in the column of the means for solving the problem will be described. In the embodiment, the motors 32 and 42 correspond to the "first and second motors", the inverters 34 and 44 correspond to the "first and second inverters", and the electronic control unit 70 corresponds to the "control device".

The correspondence between the main elements of the embodiment and the main elements of the disclosure described in the section of the means for solving the problem is an example for specifically explaining the embodiment of the disclosure described in the section of the means for solving the problem. Therefore, the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described above, the present disclosure is not limited to such embodiments at all, and it is needless to say that the present disclosure can be carried out in various forms without departing from the gist of the present disclosure.

The present disclosure is applicable to a manufacturing industry of an electrified vehicle and the like.

What is claimed is:

1. An electrified vehicle comprising:
a first motor and a second motor;
a first inverter and a second inverter configured to drive the first motor and the second motor, respectively; and
a control device configured to control the first inverter and the second inverter by setting a first current effective value command, a second current effective value command, a first current advance value command, and a second current advance value command of a first current vector and a second current vector in a dq coordinate system including a d-axis and a q-axis as coordinate axes based on a first torque command and a second torque command for the first motor and the second motor, wherein the control device is configured to set the first current effective value command, the second current effective value command, the first current advance value command, and the second current advance value command to control a torque variation difference between a first torque variation and a second torque variation of the first motor and the second motor to be equal to or larger than a predetermined torque variation difference when a torque difference between the first torque command and the second torque command is equal to or smaller than a predetermined torque difference and a rotational speed difference between a first rotational speed and a second rotational speed of the first motor and the second motor is equal to or smaller than a predetermined rotational speed difference.

2. The electrified vehicle according to claim 1, wherein the control device is configured to set the first current effective value command, the second current effective value command, the first current advance value command, and the second current advance value command to minimize one of the first torque variation and the second torque variation.

3. The electrified vehicle according to claim 1, wherein the first motor and the second motor are mounted to drive a right drive wheel and a left drive wheel, respectively.

* * * * *